United States Patent [19]

Williams

[11] Patent Number: 4,775,070
[45] Date of Patent: Oct. 4, 1988

[54] SYSTEM FOR PREVENTING FLUID SURGES IN FLUID TRANSPORT VEHICLES

[76] Inventor: James Williams, 4 Woodcrest Ave., Burlington, Mass. 01803

[21] Appl. No.: 107,097

[22] Filed: Oct. 13, 1987

Related U.S. Application Data

[63] Continuation-in-part of Ser. No. 017,912, Feb. 24, 1987.

[51] Int. Cl.⁴ .............................................. B65D 5/00
[52] U.S. Cl. .................................... 220/20.5; 220/1 B; 220/1 V; 220/5 A; 105/358; 105/360
[58] Field of Search ...................... 220/20.5, 22, 22.1, 220/1 B, 1 V, 5 A, 85 S; 105/358, 360

[56] References Cited

U.S. PATENT DOCUMENTS

| | | | |
|---|---|---|---|
| 1,457,065 | 5/1923 | Johnson | 220/22 |
| 2,056,820 | 10/1936 | Bradley et al. | 220/1 V |
| 2,091,731 | 8/1937 | Gredell | 220/22 |
| 2,208,621 | 7/1940 | Ball et al. | 220/1 V |
| 2,417,337 | 3/1947 | Whitesell, Jr. | 220/5 A X |
| 2,513,450 | 7/1950 | Carlisle, Sr. | 105/360 X |
| 2,920,784 | 1/1960 | Boardman | 220/1 B |
| 3,187,766 | 6/1965 | Black | 220/5 A X |
| 4,476,788 | 10/1984 | Loevinger | 105/358 X |
| 4,483,454 | 11/1984 | Rogers et al. | 220/1 V X |
| 4,611,724 | 9/1986 | Watkins | 220/1 V X |

Primary Examiner—Steven M. Pollard
Attorney, Agent, or Firm—Pravel, Gambrell, Hewitt, Kimball & Krieger

[57] ABSTRACT

An internal baffle system comprising a plurality of upper stationary baffles spaced along the top interior wall portion of the tank and extending downward to a point within the tank, a second plurality of stationary baffles along the bottom floor portion of the tank and extending upward into the tank, a floor portion positioned substantially along the central interior of the tank for isolating the tank into an upper fluid portion and a lower fluid portion along its length, the floor portion including a centrally located panel member rotatable between open and closed positions, wherein in the open position allows fluid flow between the upper tank portion and the lower tank portion, and in the closed position any fluid contained within the lower half of the tank would be isolated from fluid or space in the upper half of the tank, thus creating a lower center of gravity of the tank, thus creating a lower center of gravity of the tank of the fluid being transported, and at the same time preventing any movement of the fluid that would create a surge within the tank.

13 Claims, 2 Drawing Sheets

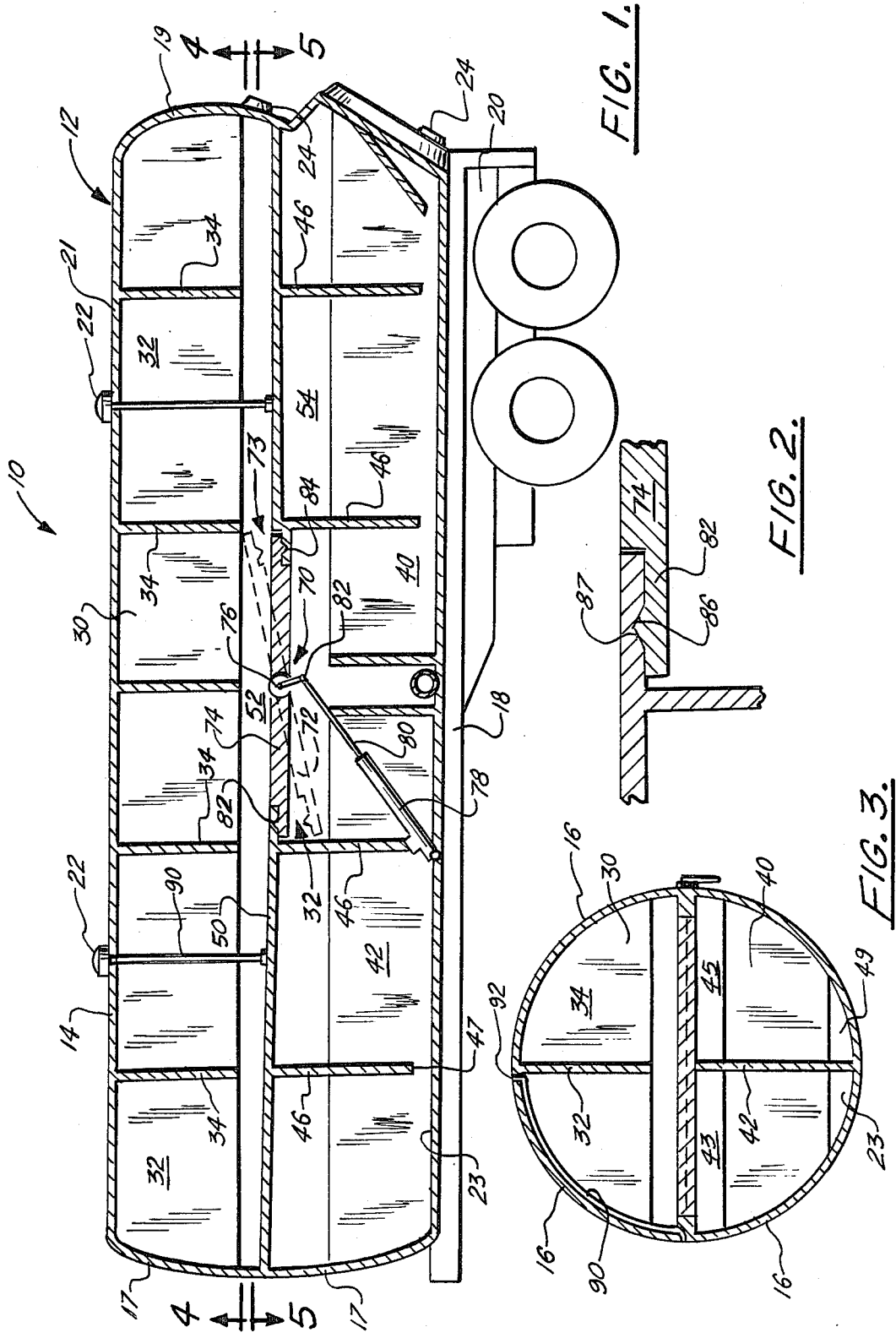

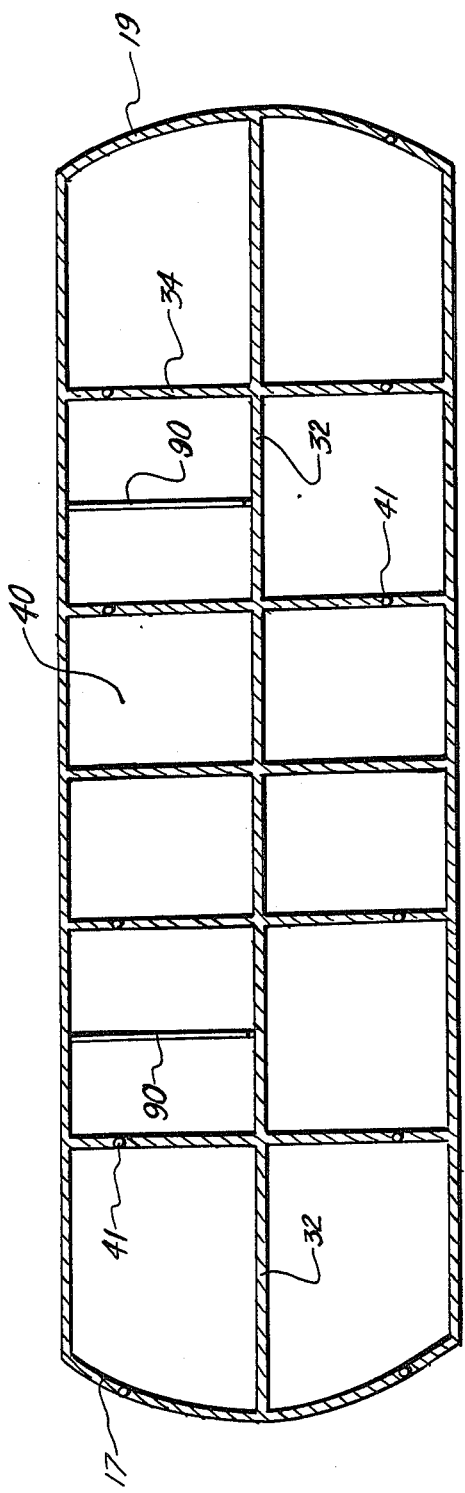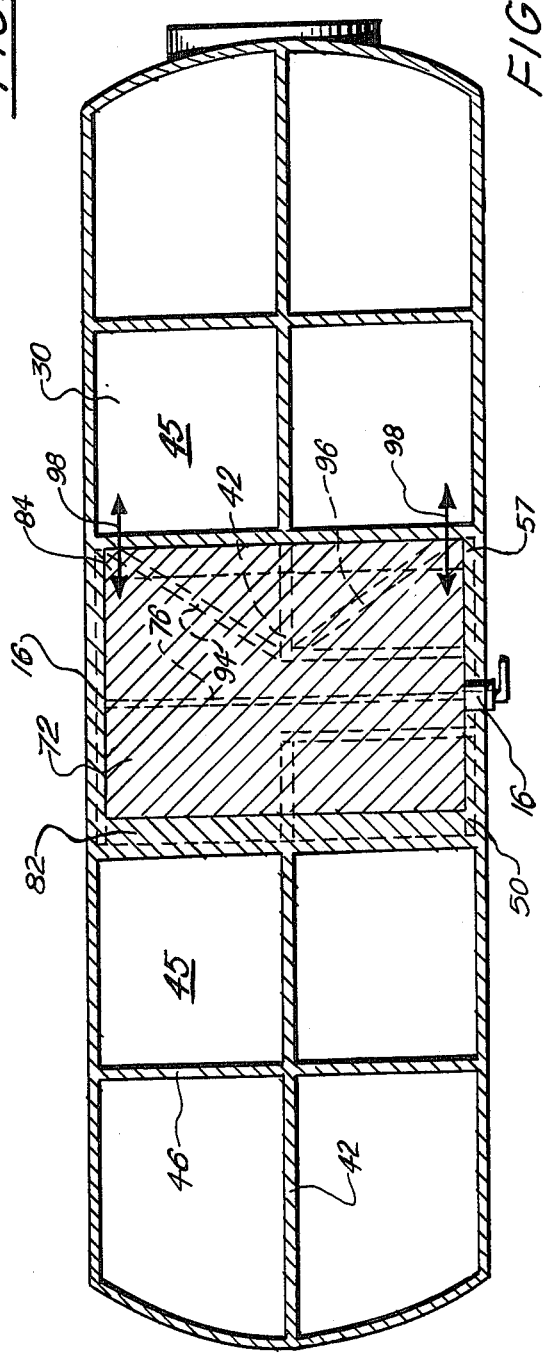

SYSTEM FOR PREVENTING FLUID SURGES IN FLUID TRANSPORT VEHICLES

This is a Continuation-in-Part application of U.S. Application entitled "System For Preventing Fluid Surges In Fluid Transport Vehicles", bearing U.S. Ser. No. 17,912, filed Feb. 24, 1987, by the same inventor, presently pending.

BACKGROUND OF THE INVENTION

1. Field of the Invention:

The system of the present invention relates to transport vehicles. More particularly, the present invention relates to a system for eliminating or reducing fluid surges in a transport vehicle particularly when the transport portion of the vehicle is partially filled with fluid and provides a means for reducing fluid surges that would normally occur in such instances.

2. General Background:

The transport of various types of fluids, including fluid hydrocarbons, and other volumes of fluids, it is most commonly undertaken in a transport vehicle of the type which would include a single or double elongated tank portion horizontally disposed on a frame, the entire transport portion being pulled by the truck. These "tankers" are used often to transport vast quantities of fluid material, i.e., between 20 to 50 thousand gallons or more so that the liquid, contained in the fluid portion of the vehicle, which creates an enormous amount of inertial mass as the vehicle is attempting to accelerate or to decelerate in stopping the vehicle, or attempting to undertake sharp turns of the vehicle during transport.

Although the total weight or inertial mass of the fluid is the problem during transport, one of the more common and perhaps more dangerous problems is the situation where the fluid contained in the transport portion of the vehicle is not fully loaded with fluid. In that event, when the vehicle must attempt to stop sharply or to undertake sharp turns, the inertial force created by movement of the fluid causes a surge wave within the transport section thus causing an enormous shift of weight in the vehicle, which, depending on the type of maneuver being undertaking, may cause the vehicle to continue moving rather than stop, or in the worse case, may cause such a lateral shift in the weight of the fluid that the vehicle will be tipped over on its side and upended.

One of the more common methods that have been attempted to be utilized in this type of event, is the use of a baffling system on the floor of the transport section, which would normally comprise a series of walls along the bottom portion of the vehicle which would tend to separate the fluid in the vehicle into a lesser quantity of fluid and would attempt to avoid fluid surge within the vehicle. This baffling system for the most part has met with limited success, but has not solved the problem of fluid surges when the fluid contained in the vehicle does have space within the fluid section to surge vis-a-vis the movement of the vehicle.

There have been attempts to suggest placing panel type members to act as baffles against tank surges, which, however, have left flow spaces between the tank portions wherein fluid would be allowed to move between the portions of the tank. Therefore, in those instances when a transport vehicle is undertaking a rather lengthy curve or a steep climb, during the time period that the curve or climb is being undertaken, the fluid is surging due to the centrifugal force or gravity on the fluid, through the holes in the baffles, which could cause a problem of uneven distribution fluid during the turn or climb. Therefore, the fluid is not separated or isolated into separate compartments within the transport vehicle.

Therefore, there is a continuing search for a solution to the fluid surge problem in these types of vehicles. Several patents have been issued in the field, the most pertinent being as follows:

German Patent No. 2,413,860, entitled "Tanker For Liquid And Dry Loads—With Hinged Bulk Heads To Stabilize Liquid Loads During Travel", teaches the use of a single tank fitted with a number of filling ports made for carrying loads such as gravel, etc. The tank which may be tipped rearwards to assist in moving the load, while including pneumatic attachments fitted to speed deliver. For carrying liquids, the tanker would be fitted with a number of bulk heads pivoted on transverse axles, with a bulk head fitted between every two ports. The bulk heads could be secured either in the vertical or horizontal setting by securing bolts through the pivot spindles.

U.S. Pat. No. 4,331,342, entitled "Tank Wagon", relates to a tank wagon having a tank for transporting liquid material including means arranged to counteract movement of the material with respect to the tank in one direction and to pass the material in the opposite direction. This is accomplished by a series of adjustable gates in the lower portion of the baffle members which are hingedly engaged to allow fluid flow in a single direction but to prevent it from flowing in the opposite direction.

U.S. Pat. No. 4,251,005, entitled "Tank", relates to a vehicle utilizing longitudinal cylindrical baffles mounted between flat transverse support portions, the entire assembly being rigidly attached the interior walls of the tank vessel, in order to reduce and dissipate liquids surging in wave motion while adding mechanical strength for the tank in baffle assembly.

British Patent No. 659,631, entitled "Tanker Road Vehicles", relates to a vehicle tank construction in which rearward drainage of the tank compartment is retained without increasing the overall height or unduly raising the center of gravity of the tank in which the center of gravity will be well to the rear of the point of articulation of the tank tractor.

U.S. Pat. No. 4,344,636, entitled "Tank For Transporting Liquids", relates to a tank which has its higher portion located near its supporting set of wheels and a lower portion having its forward retaining wall near its draw member for the towing vehicle, in order to improve stability of the tank during travel, driving around curves or changing speed.

U.S. Pat. No. 3,310,070, entitled "Selective Valve Actuating Mechanism For Vessels", which provides transport vehicle having a number of internal bulk heads space apart to subdivide the vessel into a series of compartments which are sealed with respect to one another. The compartments are filled individually by way of man-holes or hatches further including a drainage system having emergency discharge valves for draining each of the compartments.

U.S. Pat. No. 2,417,337, entitled "Tank Especially For Vehicles"; U.S. Pat. No. 2,192,593, entitled "Trailer Tank"; U.S. Pat. No. 2,163,387, entitled "Vehicular Tank"; and U.S. Pat. No. 2,091,731, entitled "Tank" all relate to various types of transport vehicles and configurations of the interior tank portions therein.

SUMMARY OF THE PRESENT INVENTION

The system of the present invention relates to an improved system over the inventor's presently pending application, entitled "System For Preventing Fluid Surges In Fluid Transport Vehicles", filed Feb. 24, 1987, for preventing fluid surges in fluid transport vehicles. What is provided is an internal baffle system comprising a plurality of upper stationary baffles laterally spaced along the top interior wall portion of the tank and extending downward to a point within the tank, a second plurality of stationary baffles laterally opened along the bottom floor portion of the tank and extending upward into the tank, an upper longitudinally disposed baffle member running the length of the tank portion and intersecting the series of upper transverse baffles, and a lower longitudinally disposed baffle member intersecting the lower baffle members throughout the tanks length, a centrally located floor portion disposed along the length of the tank for separating the tank into an upper fluid containing portion and a lower fluid containing portion, a centrally located baffle member rotatable along its center, so that in the closed position the baffle member forms a section of the floor portion and maintains the upper and lower tank portions separate, and after being rotated to the open position provides a means for allowing the fluid in the upper tank portion to flow into the lower tank portion when fluid is being drained therefrom.

There is further included a hydraulic cylinder situated on the exterior of the tank and engaged to the rotating baffle member, for moving the baffle member from the open to the closed positions, and further including a means for locking the baffle member in the closed position to form the fluid tight seal of the floor portion. In the closed position, any fluid contained within the lower half of the tank would be isolated from fluid or space in the upper half of the tank, thus creating a lower center of gravity of the tank of the fluid being transported, and at the same time preventing any movement of the fluid that would create a surge within the tank.

Therefore, it is a primary object of the present invention to provide a system for preventing fluid surges within a fluid transport vehicle;

It is still a further object of the present invention to provide a system for separating a fluid transport tank into upper and lower tank portions so that fluid is prevented from flowing along the bottom portion to the upper portion to prevent fluid surges;

It is still a further object of the present invention to provide a system of baffles and a single moveable panel that would isolate a portion of the fluid tank so that any fluid contained in the lower portion of the tank would be unable to surge into that area of the tank that does not contain fluid;

It is still a further object of the present invention to provide a truck for upper and lower tank portions for any size truck that may transport fluid therein, the transport portion of the truck including a moveable baffle that may be operated from the outside through a hydraulic system.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 1 represents an overall side view of transport vehicle utilizing the system of the present invention;

FIG. 2 represents an isolated cross-sectional view of the locking mechanism between the baffle and the floor portion in the system of the present invention;

FIG. 3 illustrates a cross-sectional view of the transport truck in the system of the present invention;

FIG. 4 represents a cross-sectional view along lines 4—4 in FIG. 1 of the system of the present invention;

FIG. 5 represents a cross-sectional view along lines 5—5 in FIG. 1 of the system of the present invention;

DETAILED DESCRIPTION OF THE PREFERRED EMBODIMENT

FIGS. 1-5 illustrate the preferred embodiment of the apparatus of the present invention by the numeral 10. The system as illustrated by the numeral 10 would be positioned within a fluid transport tank 12 which would generally comprise an elongated internal tank portion 14 having an annular surrounding wall portion 16. The tank 12 is horizontally positioned upon a frame 18 with a rear support wheel base 20, and attached to a truck tractor unit (not illustrated) for transport of the fluids contained within fluid portion 14. Generally speaking, tank portion 14 would normally have a plurality of filling or man holes 22 on its upper most portion for flowing fluid thereinto, and outflow valves 24 for removal of fluid upon completion of transport.

As seen in the FIGURES, particularly in FIG. 1 in side view, the present invention would comprise generally an upper internal baffle system 30 a lower internal baffle system 40 and a floor means 50 intermediate the baffle systems 30 and 40 for bisecting the tank portion and establishing an upper and lower fluid communication chambers 52 and 54 respectively, which could at certain times as will be discussed further, prevent fluid flow from flowing between chambers 52 and 54 during transport.

Turning to the baffle systems 30 and 40, upper baffle system 30 would comprise a longitudinal partition member 32 which bisects the tank vertically and is positioned along tank's longitudinal center line. The longitudinal partition 32 extends throughout the length of tank portion 14 between the forward wall 17 and the rear wall 19. Further, longitudinal partition 32 is rigidly attached to the upper most wall 21 of tank 16 along its entire length, and is partially attached along the interior surface of rear wall 19 and the interior surface of front wall 17, to a depth not which would not interfere with the centrally located floor means 50, as will be discussed further.

In addition, longitudinal partition 30 is bisected laterally with a plurality of baffle members 34 extending at spaced intervals across the width of tank portion 14, and extending downward to a depth no deeper than the depth of longitudinal partition 30. In this manner, the upper portion of the tank 14 is therefore provided with a baffle system that extends down to a certain depth within the tank, and could prevent any surging of fluid that would be contained in this upper portion of the tank.

Turning now to the lower portion of tank portion 14, there is illustrated, particularly in FIG. 1, the lower baffle system 40. Like the upper baffle system 30, lower baffle system 40 contains a first longitudinally extension partition 42 which extends substantially from the forward wall 17 to the rear wall 19 and attached along the bottom portion 23 along its length. Therefore, longitudinal baffle 42 would separate the lower portion of the transport tank 12 into the left and right fluid containing zones 43 and 45.

Further, like upper baffle means 30, lower partition member 42 likewise is provided with a plurality of spaced apart transverse baffle members 46 which are rigidly attached to floor portion 50 on their upper end and along their side edges are attached to curve wall 16 and extend downward into lower fluid space 40. However, the lower most ends 47 of each baffle 46 terminate at a point above the lower floor 23, and therefore provide a flow space 49 between the lower most edge of transverse baffles 46 and lower tank base 23 so that fluid contained within the lower portion may flow intermediate the transverse baffles during transport.

Turning now to the central container space of tank 12, there is provide floor portion 50, which for the most part is a stationary floor extending midway within tank 12 from the front wall 17 to the rear wall 19 to define an upper tank portion 30 and a lower tank portion 40. However, one section of floor portion 50 includes a means 70 for allowing the movement of fluid from the upper tank portion 30 to the lower tank portion 40, or vis-versa, as fluid is being either transported, or transport portion 12 is being filled or emptied with fluid. This means, as illustrated in FIGS. 1 and 2, includes a centrally rotatable panel 72 which is centrally located within the tank portion 12, and has a thickened body portion 74 with an axle member 76, as seen in phantom view at FIG. 5, running throughout its width, axle member 76 rotatably mounted in wall 16 at its end portions, so that member 72 may rotate between a closed position to the opened position as seen in phantom view in FIG. 1. This rotation of panel 72 to the open position would provide a flow space 73 for fluid to gain passageway between upper section 30 and lower fluid section 40. While in the closed position, baffle member 72 would form a continuous seal to define the continuous floor portion 50 as seen in FIG. 1.

As seen also in the Figures, rotatable baffle 72 is operated via an externally located hydraulic cylinder 78, having a ram 80 connected to an exterior handle member 82 which is in turn attached to axle member 76, so that the hydraulic cylinder may be activated by the driver, and of course, extension of the ram would force the baffle to the open position, and retraction of the ram 80 would rotate the baffle to the closed position in the sealing mode.

Reference is now made to FIG. 2 which illustrates in detail the means wherein baffle member 72 seals against floor portion 50 in the closed position as seen in FIG. 1. As seen in the Figure, baffle members has a thickened body portion 74, throughout its main body portion, and having a lower sealing edge 82 on the first edge and an upper sealing edge 84 on its opposite edge. Edges 82 and 84 include a peak portion 86 which matingly engages with a recess 87 in floor portion 50 so that in the closed position as seen in FIG. 2 in addition to shoulder to shoulder seal, the mating between the peak 86 and recess 87 provides a further means for avoiding any fluid flow between chamber 30 and 40. Further, it should be noted since baffle member 72 only rotates to the open position in the counter-clock wise direction, that the upper sealing edge 84 must be on the top of the body 72 in order to allow it to rotate to the open and for it to sealingly engage as seen in FIG. 1.

Further included in the system is a pair of vent tubes 90 which is seen in FIG. 3, and extends from substantially the center of body portion 12 up along the inside edge of wall 16 to vent out to atmosphere at point 92. Therefore, any fluid pressure that may be building up within lower portion 40 is relieved through vent tube 90, and the fluid or gas pressure within the system is relieved.

For purposes of illustration, FIG. 4 is taken along lines 4—4 in FIG. 1, and illustrates the upper view of the baffle of the system of tank portion 40. It is noted that the transverse baffles 34 running across-wise of tank portion 40 intersect the longitudinal baffle 32 and therefore the results are a series of chambers which effectively serve to partition off the fluid in the tank and prevent surges within the upper portion of the tank. Likewise, in FIG. 5 taken along lines 5—5 in FIG. 1, illustrate the system of the baffle within the lower portion of the tank, again with transverse baffles 46 intersecting longitudinal baffle 42 to likewise trade a series of chambers 45 within the lower portion of the tank. As seen in phantom view in FIG. 5, the rotating baffle member is shown in the closed position with lower sealing edge 82 in sealing engagement against floor 50 and upper sealing edge 84 in sealing engagement with floor 50 to define the floor 50 in the separation of the tank 30 and 40. Also illustrated in FIG. 5, in phantom view, is a pair of angulated baffle members 94 and 96 which extend from the mid point and intersect baffle 42 and angle towards the rear of transport portion 40, yet provide a fluid flow space as illustrated by Arrows 98 so that fluid flow, although prevented from surging from the rear of the portion to the front of the portion by angulated baffles 94, does have a minimum flow along the side walls and the tank portion.

It is therefore foreseen that the main purpose of this invention is to reduce accidents which are caused by surge of fluid and to save wear and tear on parts due to the added friction because of movement of the load. It is foreseen in that the system could be used with any type of fluid included water, hydrocarbon fuels, sludge, etc. The overall purpose is to contain ½ of the load from surge. This would keep the load weight in the center and when the load is full only ½ of the load tends to move within the tank. This would allow the other half of the load to act as a weight and help to better stabilize the load so that the vehicle may be centered. When the load is ½ full, the panels are in the closed position and there would be no surge. When the load is less than ½ full, the load could be isolated to the lower half of the vessel, and therefore would surge only ½ the distance in the interior of the tank. This less movement not only saves wear and tear of equipment, but helps the driver to have better control of the vehicle.

It is foreseen that the moveable panel 72 should be constructed of materials that would cope with the type of fluids such as rust, stress and friction. It is also foreseen the panel 72 could be constructed so that it could be broken down into smaller sections so that it could be removed for cleaning or repair. Overall, the system would allow the driver of the truck who has less than a full load to feel assured that the type of surge that he would normally get in the present state of the art would be no longer a problem in the overall control of the vehicle.

In addition, in order to facilitate cleaning of the interior of the tank portion, it is foreseen that the underside or top side of the tank portion may be constructed of individual panels bolted together to form the entire tank portion. Therefore, the panels could be removed and the interior of the tank portion cleaned rather easily. In addition, the individual baffle members may be bolted to panels so that the baffles may be likewise removed as the panel members are removed to facilitate cleaning.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A system for preventing fluid surges in transport vehicles of the type having a primary tank portion, the system comprising:
   a. a primary tank having a continuous side wall for defining a fluid storage zone therewithin;
   b. floor means within the primary tank portion separating the primary tank portion into at least first upper and a second lower storage zone, each zone substantially isolated from one another; and
   c. at least one baffle member on the floor means between the first and second storage zones, rotatable to a first portion for selectively allowing fluid flow between the first and second storage zones, and to second position preventing fluid flow between storage zones.

2. The system in claim 1, further comprising baffle members on the top side of the primary tank portion for assisting in preventing surges within the tank.

3. The system in claim 1, further comprising baffles on the bottom side of the primary tank portion for assisting in preventing surges in the tank.

4. The system in claim 1, wherein the baffle member between the first and second storage zone is selectively rotatably on an axis to move said baffle member from the first sealing position between the first upper and second lower storage zone to a second closed position isolating the first upper and second lower storage zone.

5. The system in claim 4, wherein there is further included a locking member on the baffle member to lockingly engaged the floor means when the baffle member is in the closed position for preventing fluid seepage between the upper and lower storage zones.

6. The system in claim 4, wherein the baffle member is moved from the sealing to the non-sealing position hydraulically or manually.

7. A system for preventing fluid surges in fluid transport vehicles, the system comprising:
   a. a primary tank portion having a continuous side wall for defining a fluid storage compartment therewithin;
   b. a floor portion extending substantially midway through the primary tank portion for sealingly separating the primary tank portion into an upper storage zone and a lower storage zone;
   c. a single panel member within the stationary floor portion rotatable from first sealing position defining a section of the floor portion, to a second open position defining means for allowing fluid to flow between the upper and lower storage portions; and
   d. means for moving the single panel member between the sealing and unsealing positions.

8. The system in claim 7, further comprising stationary baffle members contained within the said first and second storage zone for assisting in preventing fluid surges within each of said zones.

9. The system in claim 7, wherein the single panel member further includes sealing means on its edges for sealingly engaging the floor portion to prevent seepage between the upper storage zone and the lower storage zone.

10. The system in claim 7, wherein there is further provided means for allowing fluid pressure within each of said zones to weep out of said zones to relieve pressure therewithin.

11. A method for preventing fluid surges in fluid transport vehicles, wherein the vehicle includes a primary tank portion, the method comprising the following steps:
    a. separating the primary tank portion into a first upper zone and a second lower zone along substantially its mid longitudinal axis;
    b. providing a single panel member between said first and second tank storage zones, said single panel member movable between a first fluid sealing position and a second fluid flow position;
    c. allowing fluid to be contained within one of said zones, while said single panel member is in said sealing position;
    d. providing sufficient fluid within said zones so that the fluid contained in said zone is unable to surge within said storage zone; and
    e. moving said single panel member to an open fluid flow position, so that fluid that may be contained within the upper fluid zone is able to flow into the lower fluid zone and be removed from the primary tank portion.

12. The system in claim 11, wherein the single panel member is movable either hydraulically or manually.

13. The system in claim 11, wherein there is further provided stationary baffle members within each of said storage zones for assisting in preventing fluid surges therewithin.

* * * * *